United States Patent Office.

SAMUEL EDWARD KELLY, OF PHILADELPHIA, PENNSYLVANIA.

Letters Patent No. 112,467, dated March 7, 1871.

IMPROVEMENT IN PUTTING UP HAMS.

The Schedule referred to in these Letters Patent and making part of the same.

I, SAMUEL EDWARD KELLY, of Philadelphia, county of Philadelphia, State of Pennsylvania, have invented an Improvement in the Packing of Hams, &c., of which the following is a specification.

Nature and Object of the Invention.

My invention consists of a ham or other joint of cured meat incased in an air-tight metallic integument, so as to prevent the deterioration of the meat by evaporation of its juices and the ravages of insects.

General Description.

Joints of salted and smoked meats, such as hams, smoked beef, &c., become deteriorated during storage and transportation, owing to two main causes: first, the evaporation of the juices, which results in the loss of weight, excessive dryness, and consequent loss of most of the nutritious properties of the meat; and, second, by the ravages of the insects known as skippers, the larvæ of the ham-fly.

With the view of preventing these evils, it has been the practice to incase hams and other joints of cured meat in canvas covers, but even when thus incased a ham stored during the summer months will lose in weight from three to four pounds, and, if there be the slightest hole in the cover, the ham-fly will gain access to the contents, and the partial destruction of the meat by skippers will be the result.

An effectual remedy for these evils is the inclosing of the ham or other joint in an air-tight casing of metal. This I accomplish by striking up or bending tinned plates so that they will conform, or nearly conform, to the shape of the joint, and then soldering the plates where they meet or lap over each other, so that the entire joint is incased within a perfectly air-tight metallic integument, the casing being furnished with a metallic eye or hook, so as to admit of being readily handled and suspended.

By this casing not only is the absorption of the juices prevented, but the exclusion of the ham-fly rendered certain.

Claim.

As a new article of commerce, a ham or other joint of cured meat inclosed in an air-tight metallic integument.

In testimony whereof I have signed my name to this specification in the presence of two subscribing witnesses.

SAMUEL EDWARD KELLY.

Witnesses:
 WM. A. STEEL,
 T. B. RICHARDS.